June 9, 1953     W. B. ELMER     2,641,625
BATTERY CONTAINER
Filed Feb. 25, 1946
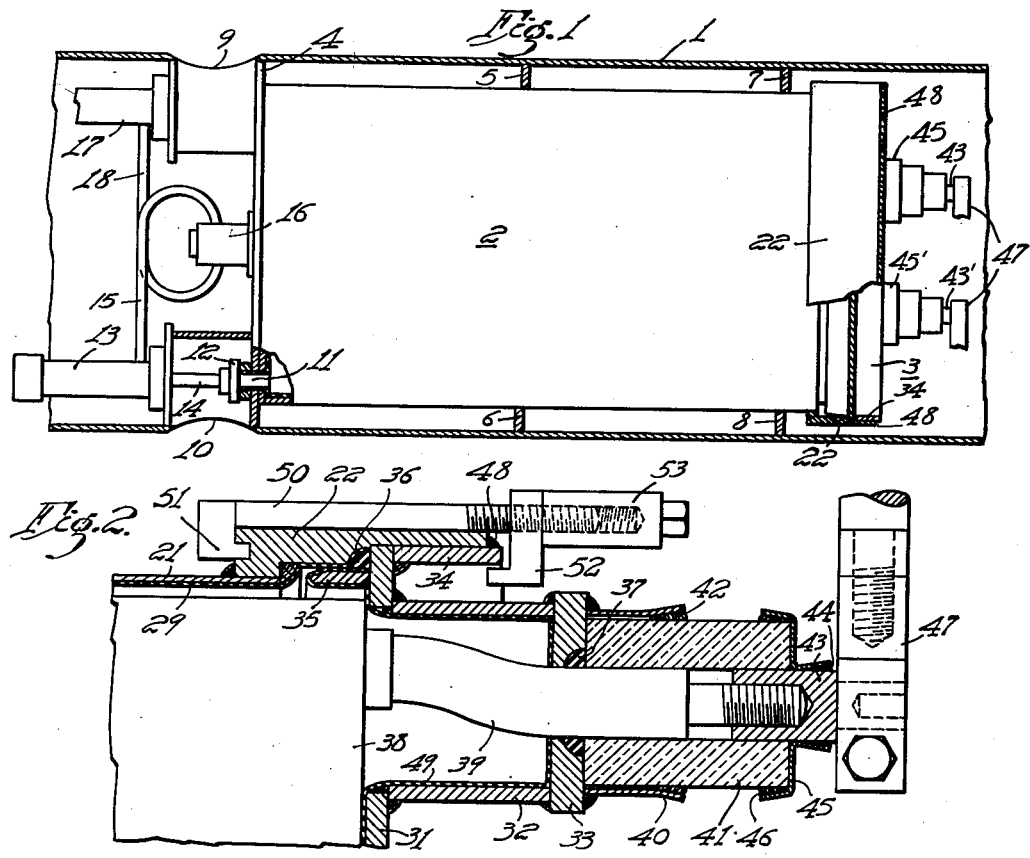
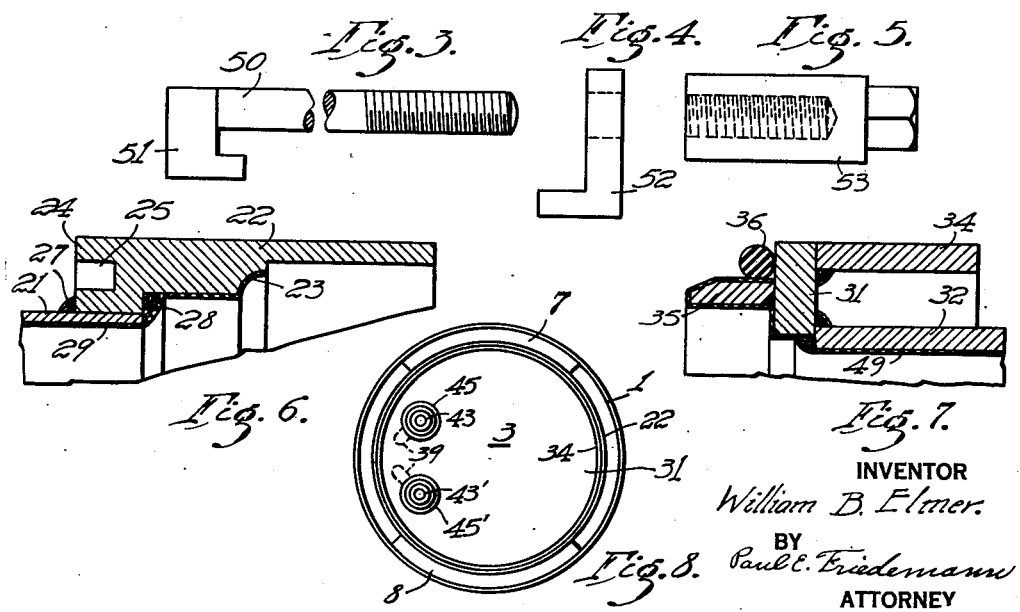
INVENTOR
William B. Elmer.
BY
Paul E. Friedemann
ATTORNEY Patented June 9, 1953

2,641,625

UNITED STATES PATENT OFFICE 2,641,625

BATTERY CONTAINER

William B. Elmer, Lakewood, Ohio, assignor, by mesne assignments, to the United States of America as represented by the Secretary of the Navy Application February 25, 1946, Serial No. 650,051

6 Claims. (Cl. 136—166)

My invention relates to containers for electric batteries, particularly to battery caskets for electric torpedoes or the like missiles.

It is an object of my invention to provide a container structure, and a method of making such structure, which is formed mainly of sheet steel and fits the dimensions of the battery electrodes so closely as to require minimum space and weight and which nevertheless affords a safe insulation of the metallic container surfaces from the electrolyte and from the battery terminals even though the terminal may traverse the container end plates very close to the container edge.

It is also an object of my invention to provide a container for a primary torpedo battery which is activated by the admission of sea water serving as the electrolyte and which secures minimum space for the water to keep the weight of the admitted water as low as possible. A further object of the invention is the provision of a container structure in accordance with the aforementioned objects that permits being manufactured from thin-walled sheet material by welding without the danger of having the insulating coating or gasket means of the container damaged by the welding heat.

These objects of the invention and the novel method and means to be applied for achieving them will be apparent from the following description of the embodiment illustrated in the drawing.

Figure 1 shows a longitudinal sectional view of part of an electric torpedo containing a propulsion battery.

Fig. 2 shows a section through a corner of the battery container including one of the battery terminals.

Figs. 3, 4 and 5 represent three respective parts of a clamping device to be applied during manufacturing or for testing the battery container, before the container is completed by a final welding operation.

Figs. 6 and 7 are sectional views of details of the container structure shown in Figs. 1 and 2; and Fig. 8 is an end view on the end plate of the battery container showing the location of the two battery terminals.

Referring to Fig. 1, numeral 1 denotes the shell of a torpedo which is equipped with a casket for an electric propulsion battery. The casket has one of its ends closed and hermetically sealed by means of a cover unit 3 while the other end of the casket is attached to and supported by a bulkhead 4. Partitions 5, 6, 7 and 8 serve to secure the casket in position relative to the torpedo shell 1.

The shell has two openings 9 and 10 each leading into a small port chamber which is sealed against the interior of the torpedo but in communication with the interior of the battery casket 2 through respective port openings such as the one denoted by 11. These openings are covered by a structure 12 which is tightly soldered to its seat and at the proper time torn therefrom by means of a pulling engine 13 consisting of a cylinder and piston device. The appertaining piston rod 14 is attached to the cover structure 12. A pressure tube 15 connects the cylinder chamber of pulling engine 13 with a pressure control device 16 which may consist, for instance, of an explosion chamber. The second port cover, not visible in Fig. 1, is similarly attached to a pulling engine 17 to which pressure is supplied through a tube 18 from the same control device 16.

Upon launching of the torpedo, the sea water enters into the port chambers through the openings 9 and 10 respectively. The charge in the explosion chamber 16 is then released and causes the pulling engines 13 and 17 to remove the cover structures from the two port openings of the battery casing 2. As a result, the sea water is admitted to the interior of the battery and activates the battery electrodes by serving as an electrolyte. To ensure proper performance, the casket is preferably evacuated and hermetically sealed by the cover unit 3 and the port cover structures.

Sea water batteries of this kind have the advantage that the weight of the torpedo is at a minimum before launching and that no other provisions are needed to supply the battery electrolyte, and to keep it in agitation in order to secure optimum efficiency. It is, however, necessary to provide the battery casket and the appertaining bushings for the battery terminals with seals of such design that the sea water cannot cause short circuits or leakage between live battery parts and the casket walls. It is also desirable that the casket should fit closely the dimensions of the battery electrodes in order to keep the weight of the admitted water at a minimum. The fact that the battery terminal leads have to be brought out through the battery cover very close to the edge of the casing offers another problem.

It will be apparent from the following that the illustrated structure and the method for its manufacture according to the present invention affords a satisfactory solution of these problems.

As is shown more in detail in Figs. 2 and 6, the battery casket has its casing formed of a relatively thin sheet material 21. Attached to the end of this casing portion, and forming an integral structure therewith, is an annular extension member or rim portion 22 of larger wall-thickness than the casing 21 proper. Member 22 is so shaped as to form an inner peripheral ledge 23 of rounded cross-sectional contour which serves as a seat for a rubber gasket. Member 22 forms an external periperal ledge 24 at which a number of openings 25 or, instead, an annular concentric groove, are provided in order to facilitate assembling the casket in a manner described in a later place. The extension member 22 is joined with the casing wall 21 by two peripheral welds 27 and 28. The entire inner surface of the casing unit thus formed is covered by an insulating coating 29 consisting for instance of a suitable varnish.

The cover unit 3 (Fig. 1) is designed as illustrated in detail in Figs. 2 and 7. This unit has a cover plate 31 which has two openings for the passage of the battery terminals. Each of these openings is surrounded by a collar 32 which is welded to the plate 31 to form a tight unit together therewith. The top of each collar is covered by an end plate 33 which is tightly welded to the collar 32. The plate 31 is further provided with an outer peripheral flange 34 and an inner peripheral flange 35 both being welded to the plate 31 and extending in opposite directions in parallel to the longitudinal axis of the casket. Flange 35, together with the plate 31, forms a seat for a rubber gasket 36 which is to engage the above-mentioned inner ledge 23 (Fig. 6) of the casing unit. The outer flange 34 of the cover unit matches the inner diameter of the annular end area of the extension member 22. The top plate 33 of the bushing structure has a cable hole, which, at the outer surface of the top plate, is so shaped as to form a seat for a rubber gasket. The battery electrodes 38 have an insulated terminal lead 39 which passes through the cable opening of top plate 33 in sealing engagement with the rubber gasket 37. A flared tubular member 40 is welded to top plate 33 and receives an insulating bushing 41 of porcelain or the like ceramic material, with which it is joined by means of a solder seal 42 so as to maintain the gasket 37 in compressed condition. The lead 39 terminates in a metal stud 43 which is soldered at 44 to a flanged bushing cap 45. This cap is sealed at 46 to bushing 41. Attached to the stud 43 is the terminal structure 47 of a cable leading to the electric equipment to be energized by the battery. The second battery terminal is designed in the same manner. Its cable stud is denoted in Fig. 8 by 43' and the appertaining bushing cap by 45'. The interior surface of the composite cover structure is coated by insulation 49 consisting for instance of varnish. In normal production units the cover structure and the casing structure are sealed together by a peripheral weld 48 (Figs. 1 and 2).

When testing the battery casket and it is not desired to make a welded seal, or during welding the cover unit to the casing unit, several auxiliary clamping devices are preferably employed such as the one shown in Figs. 2 through 5. These clamping devices have a threaded stem portion 50 which carries a projection 51 for engaging the openings or grooves 25 of the extension member 22. A claw 52 displaceably mounted on stem 50 engages the exterior flange 34 of the cover structure and can be screwed toward the projection 51 by means of a nut member 53.

When manufacturing the battery casket, the casing unit and the cover unit are first completed individually. That is, the extension member 22 is first welded to the casing 21 and then the inner surface of the casing structure is varnished to produce the insulating coating 29. Separately therefrom the flanges 34, 35, the collars 32, their end plates 33 and flanged tubular members 40 are jointed together by welding. Thereafter, the assembled cover structure is varnished to cover its inner surface with the insulating coating 49.

After inserting the battery electrodes into the casing structure, the cover unit is mounted on the structure with the rubber gasket 36 inserted in its proper place. The battery cables 39 are threaded through the cable openings of the top plates 33 during the just-mentioned operation. Then the casing unit and cover unit are clamped together by the above-described clamping devices. Thereafter, the bushings 41 are secured to the top plates 33 so as to establish a tight seal on the cable edge by compressing the gasket 37. Finally the cable stud 43 is attached and soldered to the bushing cap 45. The clamping devices can then be tightened to secure a tight seal between casing unit and cover unit at the gasket 36. The battery is now in condition for testing and in this condition can also be used for trial runs of the torpedo or for practicing torpedoes. As a rule, however, the two units are to be finally sealed to each other by welding the extension member 22 to the flange 34 peripherally along the axially outermost edges of these two elements. While this weld, denoted by 48, is produced, the clamping devices are left in position. As a result, a double seal is obtained, one being formed by the rubber gasket and the other by the weld 48. It will be noted that a similar double seal exists at the gasket 37 and the other at the peripheral welds 42 and 44. Upon completion of these steps, the clamping devices are removed from the gasket.

An essential characteristic and advantage of the above-described structure and method will be understood from the following. The necessity of providing an insulating varnish or coating that must cover the entire inner wall surface of the container to prevent the sea water from contacting the metallic surface at any point, renders it difficult to seal such a casing by a final welding, brazing or soldering operation because the heat necessary for such operation is apt to injure the insulating coating, especially in view of the fact that the container wall, for reasons of economy in space and weight, must have a small wall thickness. This difficulty is eliminated in the above-described structure by virtue of the following two features. In the first place, the final welding is performed between two container parts of larger volume or wall thickness than the main portion 21 of the casing. Consequently, the final welding, to be performed after the inner surface has been varnished, occurs between parts of relatively large heat capacity. Furthermore, the final weld is located at a place relatively remote from the coated inner surface and also sufficiently remote from the rubber gasket 36 to prevent injury due to the welding heat.

It will be recognized from the drawing that in addition to the just-mentioned features, a battery casket according to the invention requires virtually no additional space for its sealed cover structure so that the limited space available within the torpedo shell is utilized with optimum economy. The above-described design of the terminal structures of the cover unit also contributes to obtaining sufficient safety in electrical respect at optimum saving in space. Nevertheless, the space inside the collars 32 is large and deep enough to permit the flexible cables to take reverse bends between the electrode terminals and the insulating bushing. This reverse bend is in two dimensions since the pairs of leads come from the battery electrodes at points closer to the periphery of the casket than the centers of the appertaining collars and bushings. The entire end cover and cable assembly is completely and with maximum safety sealed against electric leakage from the electrolyte to the casing walls or leads. The end covers and cable bushing assemblies are double sealed with vacuum tightness. The cable entrance structures are short and compact and require no additional space in the radial direction beyond the periphery of the casing. The terminal construction, despite the available limited space is strong, simple and rigid and permits the use of a very thick porcelain bushing to minimize breakage. Virtually no idle space within the casket is required.

It will be understood by those skilled in the art that a battery container according to the invention can be modified as to structure details without departing from the objects and essential virtues of the invention as set forth in the claims attached hereto.

I claim as my invention:

1. A container for an electric battery, comprising a casing of sheet metal for receiving battery electrodes and electrolyte and being open at one end in unassembled condition of the container, said casing having an inner annular ledge axially spaced from the casing edge at said end, a gasket disposed on said ledge, a metal plate contacting said gasket for covering said casing end and having an annular peripheral portion extending away from said gasket in juxtaposition to and surrounded by said casing, and a seal joining said casing and said portion of said cover near and along their respective edges.

2. A container for an electric battery, comprising a casing of sheet metal for receiving battery electrodes and electrolyte and being open at one end in unassembled condition of the container, a metal plate provided with battery terminals and disposed on said casing to cover said end, insulating coating means disposed on the inside surfaces of said casing and plate to prevent electrolyte from contacting said metal casing and plate, said casing having an annular rim portion projecting axially beyond said cover, and having a larger inner dimension than the adjoining port of said casing so as to form an inner peripheral ledge, a gasket disposed between said ledge and said plate, said plate having an annular portion extending axially away from said gasket in juxtaposition to and surrounded by said rim portion, and a sealing weld joining said two annular portions near and along their annular edges so as to hold said plate forced against said gasket.

3. A container for an electric battery, comprising a casing of sheet metal for receiving battery electrodes and electrolyte and being open at one end in unassembled condition of the container, an annular extension member of metal having a portion of larger wall thickness than said casing and forming an inner peripheral offset surface, said member of larger wall thickness being welded to said casing, a gasket disposed on said surface, a metal cover disposed on said gasket for closing said casing end and having an annular portion extending axially away from said gasket and closely surrounded by said extension member, said extension member and said annular portion having juxtaposed peripheral edges at their respective ends away from said gasket, and a sealing weld joining said edges so as to hold said cover forced against said gasket.

4. A container for an electric battery, comprising a casing of sheet metal for receiving battery electrodes and electrolyte and being open at one end in unassembled condition of the container, said casing having near said end an annular structure forming an inner peripheral offset and an outer peripheral offset, a gasket disposed on said inner offset, a metal cover disposed on said gasket for closing said casing end and having an annular portion extending axially away from said gasket and closely surrounded by said structure, said structure and said annular portion having juxtaposed peripheral edges at their respective ends away from said gasket, so as to permit clamping together said outer offset and said plate in order to compress said gasket before joining and sealing said edges.

5. A container for an electric battery, comprising a casing of sheet metal for receiving battery electrodes and electrolyte and being open at one end in unassembled condition of the container, a metal plate provided with terminal bushings and disposed on said casing for covering said end, an axially extending flange projecting from said plate toward said casing and joining together with said plate a peripheral offset surface, a gasket disposed on said surface, another axially extending flange projecting from said plate at the side away from said gasket along the periphery of said plate, said two flanges consisting of metal and being integral with said plate, said casing having a peripheral rim portion surrounding said latter flange in juxtaposition thereto, and a sealing weld joining said rim portion and said latter flange near and along their respective edges.

6. A container for an electric battery, comprising a metal casing for receiving battery electrodes and electrolyte, a metal cover plate sealed to said casing and being in metallic contact therewith, said plate having an opening, a metal collar integral with said plate and surrounding said opening at the outside of said plate, a metal top plate integral with said collar and having a hole and a gasket seat surrounding said hole at the outside of said top plate, a gasket disposed on said seat, a ceramic bushing disposed on said top plate and gasket, a terminal cable traversing said opening, hole and bushing so as to form a tight seal with said gasket, and sealing means joining said bushing with said top plate.

WILLIAM B. ELMER.

References Cited in the file of this patent

UNITED STATES PATENTS

| Number | Name | Date |
|---|---|---|
| 410,054 | Waldron | Aug. 27, 1889 |
| 861,242 | Edison | July 23, 1907 |
| 2,094,329 | Mascuch | Sept. 28, 1937 |